CONTAINER FABRICATING AND ORIENTING APPARATUS

Original Filed Dec. 20, 1965 6 Sheets-Sheet 1

INVENTOR.
RAYMOND W. GUZZARDO
BY Marzall, Johnston, Cook & Root
Attys

CONTAINER FABRICATING AND ORIENTING APPARATUS
Original Filed Dec. 20, 1965 6 Sheets-Sheet 2
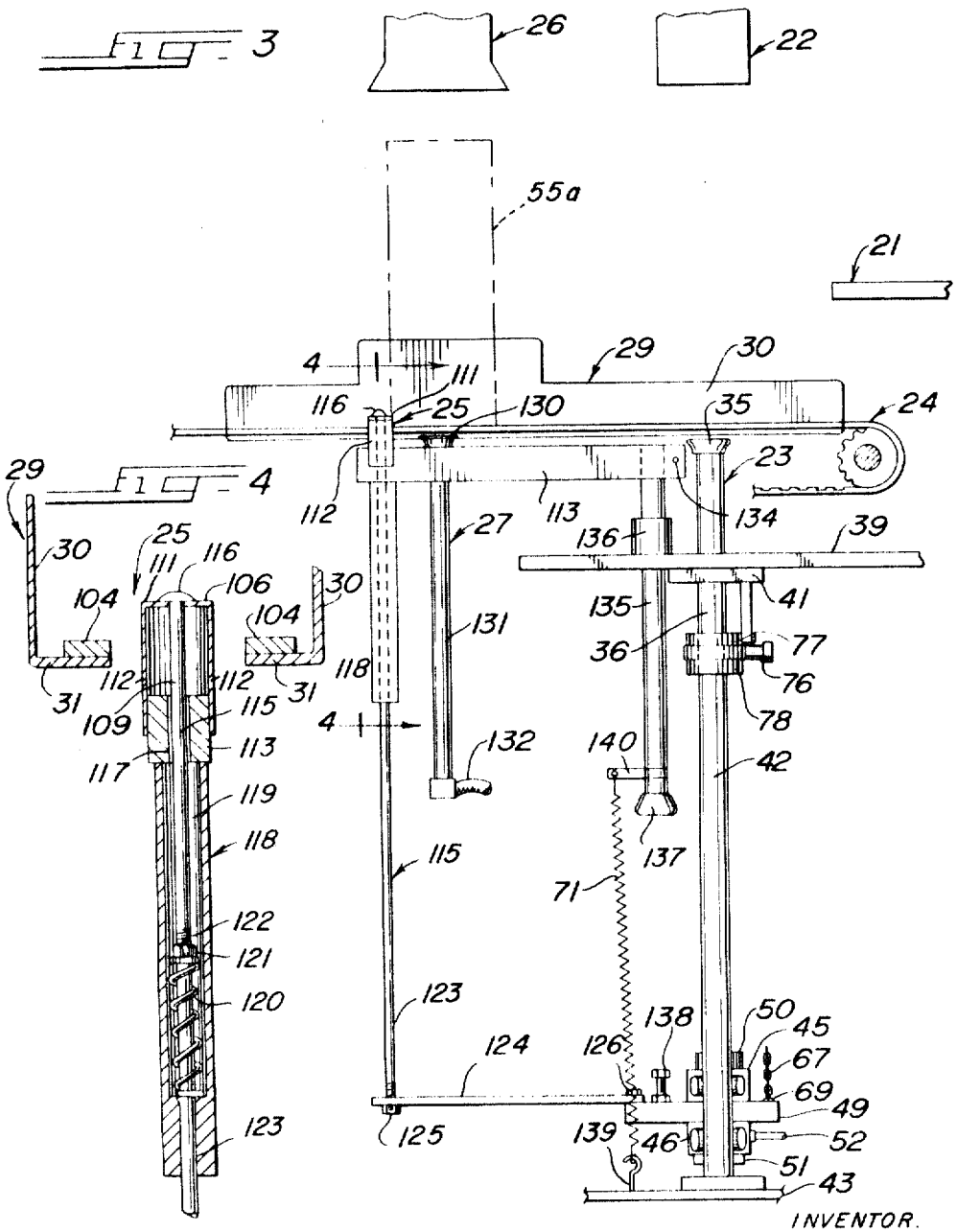
INVENTOR.
RAYMOND W. GUZZARDO
BY Marzall, Johnston, Cook & Root
ATTYS

CONTAINER FABRICATING AND ORIENTING APPARATUS

Original Filed Dec. 20, 1965 6 Sheets-Sheet 3

INVENTOR.
RAYMOND W. GUZZARDO

BY Marzall, Johnston, Cook & Root

ATTYS

CONTAINER FABRICATING AND ORIENTING APPARATUS

Original Filed Dec. 20, 1965 6 Sheets-Sheet 4

INVENTOR.
RAYMOND W. GUZZARDO
BY Mazzacco, Johnston, Fee & Root
ATTYS

CONTAINER FABRICATING AND ORIENTING APPARATUS

Original Filed Dec. 20, 1965 6 Sheets-Sheet 5

INVENTOR
RAYMOND W. GUZZARDO

BY Marzall, Johnston, Cook & Root
ATTYS

CONTAINER FABRICATING AND ORIENTING APPARATUS
Original Filed Dec. 20, 1965 6 Sheets-Sheet 6
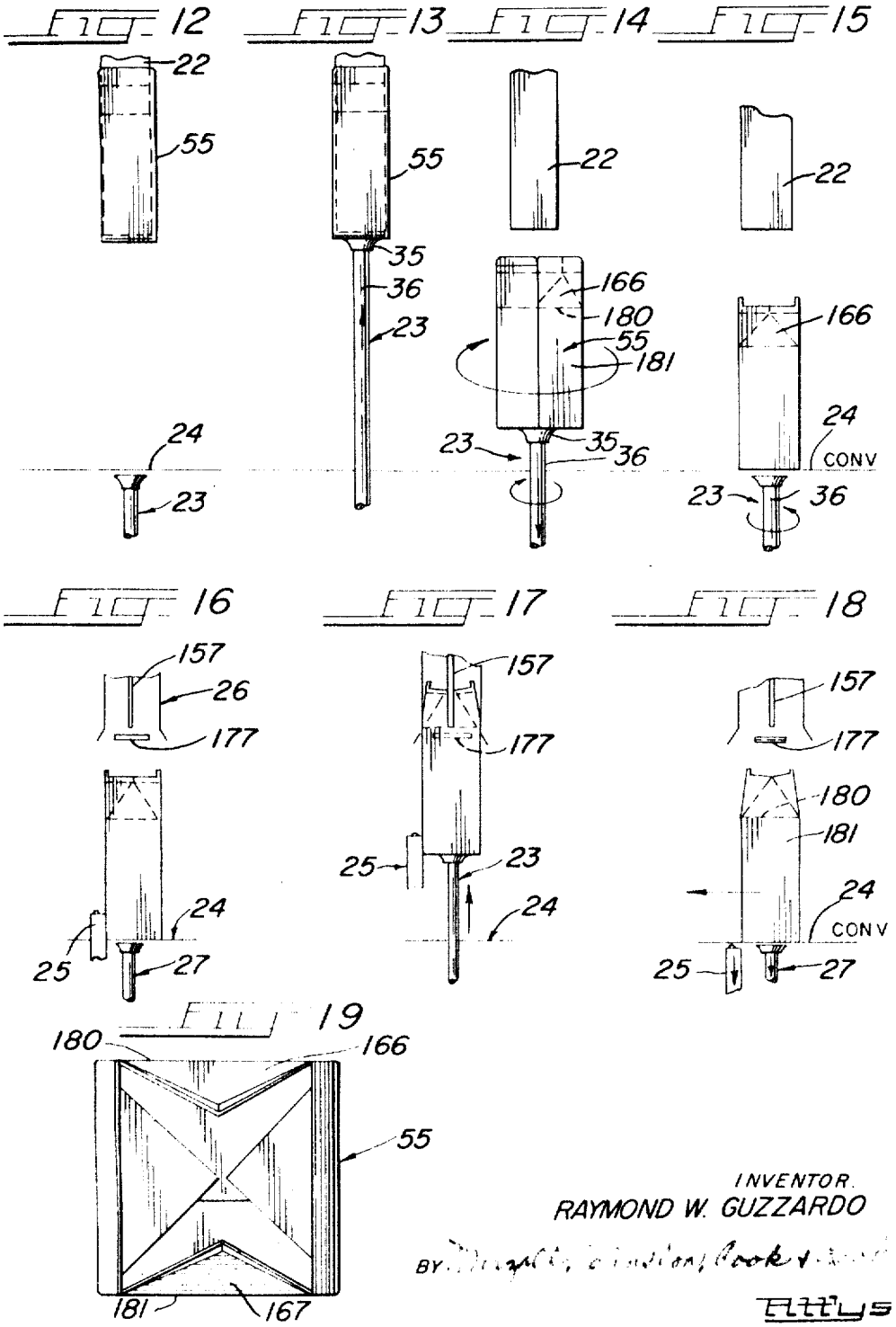
INVENTOR.
RAYMOND W. GUZZARDO
BY [illegible]
Attys United States Patent Office Re. 26,656
Reissued Sept. 2, 1969

26,656
CONTAINER FABRICATING AND ORIENTING APPARATUS

Raymond W. Guzzardo, McHenry, Ill., assignor to E. M. Melahn, doing business as Northern Illinois Machine Company, McHenry, Ill.

Original No. 3,370,515, dated Feb. 27, 1968, Ser. No. 514,868, Dec. 20, 1965. Application for reissue Apr. 29, 1968, Ser. No. 729,873
Int. Cl. B31b *1/74*
U.S. Cl. 93—36 20 Claims

Matter enclosed in heavy brackets [ ] appears in the original patent but forms no part of this reissue specification; matter printed in italics indicates the additions made by reissue.

This invention relates generally to container fabricating machinery and more specifically relates to improved means for forming the top closure structures of paperboard containers.

The apparatus of the present invention is directed to paper carton preforming machinery of the type adapted to preform and fabricate containers of cartons for packaging fluids; such containers being formulated by folding panels of prescored blanks made from thermoplastic coated paper or cardboard as typified by the container disclosed in U.S. Patent to Crawford et al. 3,116,002, issued Dec. 31, 1963, or U.S. Reissue Patent No. 25,021, issued to C. R. Alden, Aug. 8, 1961.

Containers of the above-referred to character are familiarly employed for packaging milk and like fluids and generally may be described as comprising an elongated rectangular paperboard tube of generally square cross section having a folded gabel top closure which includes a ridge portion at its upper end which is adapted to be sealed after filling the formed carton with liquid. As is well known to those familiar with the art, the paper carton blanks are normally opened from a flat or collapsed state, erected into a generally rectangular tube, and mounted over a mandril in a suitable preforming machine. Such preforming machinery generally indexes the carton carrying mandril through a series of stations whereat the bottom folds of the container carton are successively tucked in and folded along panel defining score lines, overlapped and then sealed, usually under heat and pressure. Eventually the partially formed cartons are stripped from the mandrils for the infolding and tucking of the top flap portions thereof so as to formulate the gable closure at the upper end of the carton. In some instances the top closures are temporarily sealed after formation and subsequently reopened for filling the carton with liquid in a suitable filling and top sealing machine of the character generally set out in U.S. Patent to A. A. Louis, No. 2,962,845, issued Dec. 6, 1960. In still other instances of practice, the top closures of the cartons are left open after being folded and immediately filled with liquid by a suitable filling and sealing means.

According to conventional practice in this art, a carton preforming machine is generally adapted to form one size and type of carton blank into a container ready for filling and sealing in subsequent operational stages of either a separate filling and sealing machine or adjunct stations of the preforming machine. In either event, the filling and top sealing machines usually handle only one size or type of carton having top closures and sealing flap structures. Recent developments in this art have provided combination preforming machines, or that is machines adapted to form cartons of varying sizes such as, pints, quarts and half gallon size milk cartons as selected. This advance has created certain problems not previously confronted in machines handling cartons of a single size and construction. Specifically, according to present practice, the arrangement of the top closue structure for the half gallon size carton of the character set out in the above-referred to Patent 3,116,002 and Reissue 25,021 may have the sealing ridge of the gable top closure thereof oriented along an axis disposed 90° from the alignment for such gable top ridge of the quart, pint and half pint size cartons of corresponding make and structure. At the same time the flap portions to be overfolded and sealed to enclose the bottom of all of such gable top cartons are identically aligned and formed. Thus, in forming both half gallon and quart size containers having this peculiarity on the same preforming machine, for example, the formation and sealing of the bottom closures of both sized cartons are usually identical, but the folding of the top closure flaps and panels require a reorientation and realignment of the quart and smaller size cartons from the normal orientation and alignment of the half gallon size carton before the same may be introduced to the top folding apparatus having a fixed operating position. Alternatively one might reposition the top folding means to accommodate the differences in the carton tops, but this alternative is not feasible if the cartons are automatically advanced to filling and top sealing means designed to accept cartons of a single alignment, particularly as to the top sealing flap thereof which generally passes axially along and between a pair of spaced heat sealing members.

In brief, the present invention is directed to a solution of the above outlined difficulty in automatically forming, filling and sealing paperboard cartons by a continuous operation wherein cartons having top closure sealing flaps of unlike orientation are involved. Generally speaking the improved apparatus of this invention comprises means for stripping cartons from supporting mandrils therefor, after the same have had their bottom enclosures formed and sealed, means for selectively and properly orienting the cartons for introduction to and removal from means for crimping and forming the panels of top closure means thereof and means feeding the same to subsequent liquid filling and top sealing means. The present invention also includes improved means for supporting the upper end of a carton container internally while the several flaps of the end closure thereat are folded about prescored fold lines so as to insure the proper and accurate formation of the closure while avoiding collapse and bending of the carton side walls.

An important object of this invention is to provide improved means in paperboard container forming machinery for selectively orienting cartons or containers about their longitudinal axes.

Another object of this invention is to provide improved means for orienting paperboard containers as aforesaid whereby containers having gabel top closures of similar structure but formed with their ridge axes in generally transverse planes may be formed and sealed in common top forming and sealing means.

Another important object of this invention is to provide improved means for internally supporting the upper portions of a paperboard container and the like whereby the several panels of a gable top closure thereof may be properly folded about prescored fold lines while avoiding collapse of the container wall portions adjacent thereto.

Still another object of this invention is to provide improved means for handling and positioning paperboard containers for forming and sealing top closure means thereon.

Having thus described the present invention, the best mode presently contemplated for carrying out its concepts, so as to enable those persons skilled in this art to make and use the same, will now be set forth in conjunction with the illustrated embodiment thereof appearing in the accompanying drawings, from which description the above and further objects, features and advantages of this invention will be recognized:

In the drawings:

FIGURE 3 is a view in side elevation illustrating the arrangement of the carton orienting and top forming apparatus seen in FIGURES 1 and 2;

FIGURE 4 is an enlarged cross sectional view taken substantially along vantage line 4—4 of FIGURE 3 and looking in the direction of the arrows thereon, to illustrate structural details of improved carton stop mechanism according to this invention;

FIGURES 12 through 18 are schematic illustrations of the sequential operations performed by the improved apparatus of this invention; and FIGURE 19 is a top plan view of a carton or container preformed and folded according to the operations illustrated in FIGS. 12–18.

Figure 1:
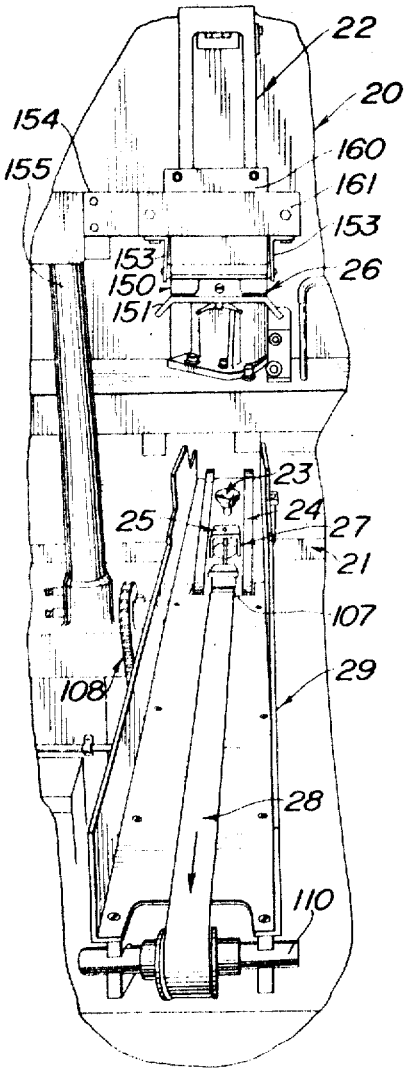
FIGURE 1 is a partial perspective view of a carton preforming machine showing the arrangement of the improved container orienting and top forming means of this invention thereon.

Turning now to the features of the illustrative embodiment of the invention shown in the drawings, it will be recognized from FIGURE 1 in particular that portions of a paperboard carton preforming machine, indicated generally by numeral 20, is shown therein; the same including a horizontal staging table 21, and a plurality of carton supporting mandrils 22, one of which is shown, and which are generally movable along a circular orbit between successive operating stations for folding and sealing the bottom closure of paperboard cartons of the type generally described in the above-referred U.S. Patents 3,113,-002 or Re. 25,021. The particular illustration of FIGURE 1 depicts the general arrangement of the improved apparatus of this invention with the preforming machine 20 and more particularly illustrates generalities of the discharge station for the preforming machine whereat cartons having the bottom closures thereof formed and sealed are ready for discharge from the forming mandrils 22 for subsequent folding and forming of the top closure thereof.

As illustrated, aligned with and below the mandril means 22 at the discharge station of the preforming machine is an improved carton stripping and orienting means 23 according to this invention, which is adapted to engage and remove cartons from the mandril 22 and deposit the same on a double-belt conveyor means 24. Cartons so deposited on conveyor means 24 are advanced thereby to a stop means 25 disposed beneath a top former means 26 and immediately adjacent to but forward of feeder means 27 adapted to advance and withdraw cartons to and from the top former means. After each carton has its top closure formed by means 26, the same is removed therefrom and fed to a discharge conveyor means 28 aligned coaxially with conveyor means 24 and mounted in the bottom of a guide chute means 29. While not shown herein, it will be understood by those familiar with the art that the conveyor means 28 serves to advance preformed cartons to subsequent means for filling the formed cartons with liquid, such as milk, and sealing the top closures thereof.

Figure 2:
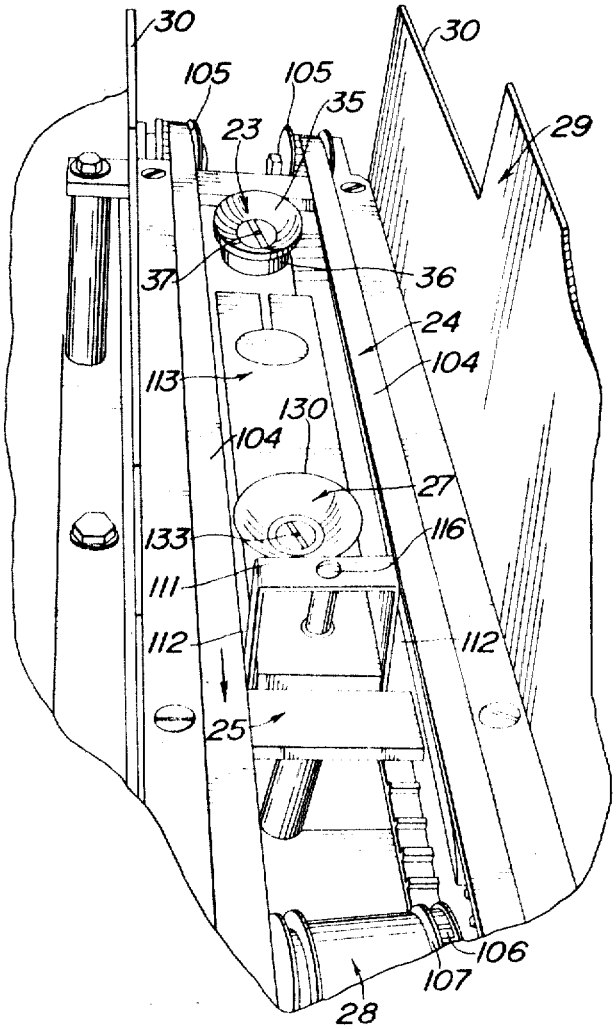
FIGURE 2 is another partial perspective view, showing portions of the apparatus seen in FIGURE 1, but at an enlarged scale thereover, and illustrating in greater detail the means for orienting cartons and for feeding the same to an overdisposed top forming means.

Reference is now made to FIGURES 2 through 8 of the drawings whereat the structural arrangement of the elements comprising the combination of this invention are set out in greater particular. As will best be understood from FIGURE 2, the carton stripping and orienting means 23 is located in general coplanar alignment with the top former feeder means 27, between the runs of the double-belt conveyor means 24 and intermediate the spaced, vertically extending guide rails or walls 30, 30 of the guide chute means 29 having coplanar bottom wall portions 31, 31. The portions of the stripping and orienting means 23 shown in FIGURES 1 and 2 of the drawings, comprise a rubber suction cup 35, mounted at the upper end of generally cylindrical spindle 36 so that the upper end of the suction cup is below the plane of the bottom of chute means 29 and the upper runs of the conveyor means 24. The spindle 36 is hollow and encloses a passageway axially thereof which communicates at its lower end with vacuum pump means (not shown), whereby the air within the spindle 36 is evacuated periodically, to provide a pneumatic suction within the suction cup 35 by means of a small orifice 37 formed in the bottom of the vacuum cup 35 and at the upper end of its connection with the spindle 36, as best shown in FIGURES 2 and 3.

Figure 5:
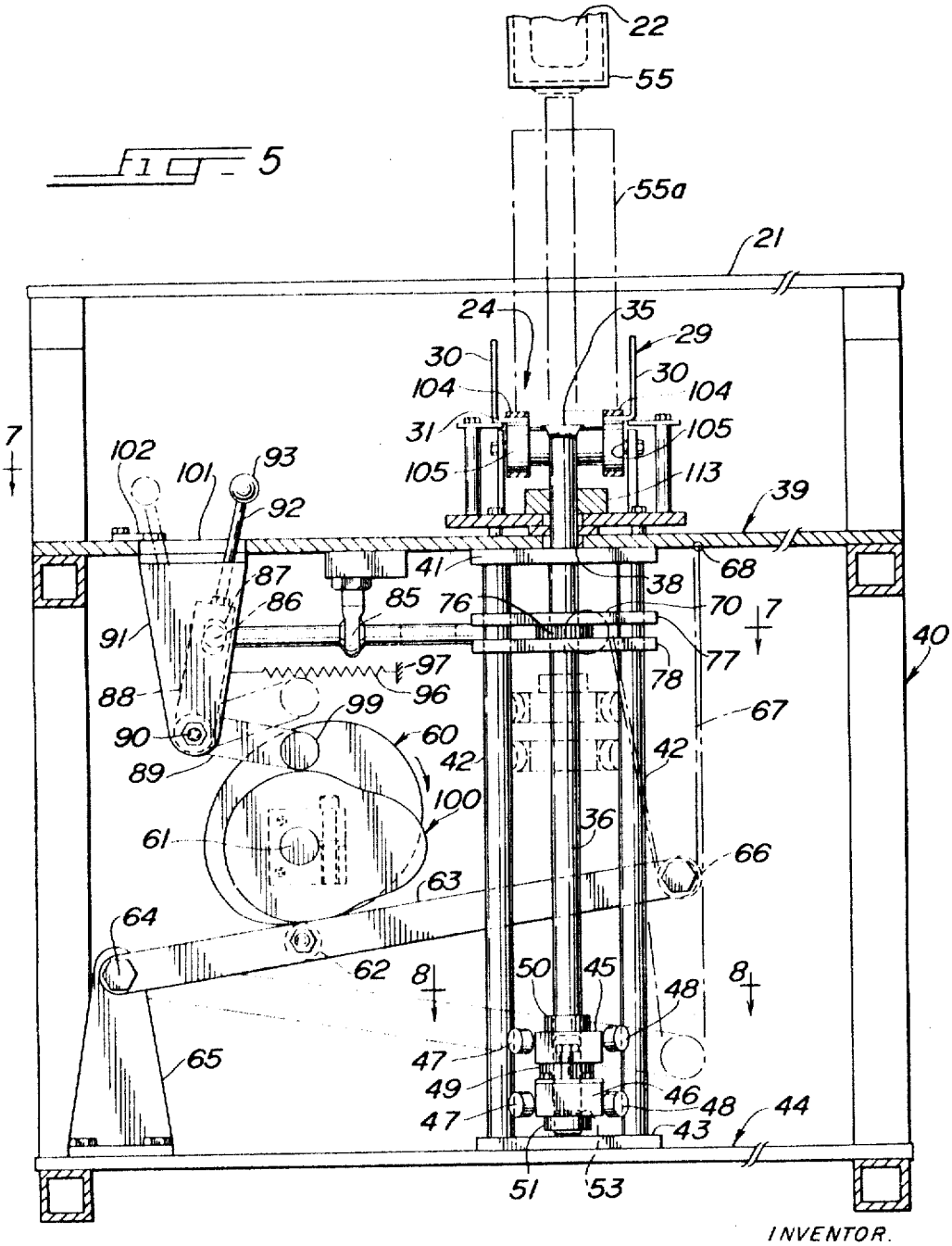
FIGURE 5 is a front elevational view of the apparatus illustrated in FIGURE 3 with parts in cross section showing particulars of the means for actuating the same.

As shown in FIGURES 3 and 5 in particular, spindle 36 is mounted substantially vertically upright to extend through an opening 38 formed in a lower supporting platform member 39 mounted on the machine's framework 40, substantially in parallel spaced relationship to and forwardly of the staging table 21 of the preforming machine. The spindle 36 is guidingly supported adjacent its upper end, for vertical reciprocating movement by guide plate 41 fastened to the under side of the platform 39. Spindle 36 is flanked by a pair of laterally spaced guide rails 42, 42 which depend vertically from the guide plate 41 to a mounting pad 43 rigidly fixed to the upper face of a horizontal bed plate 44 on the machine frame 40.

Figure 8:
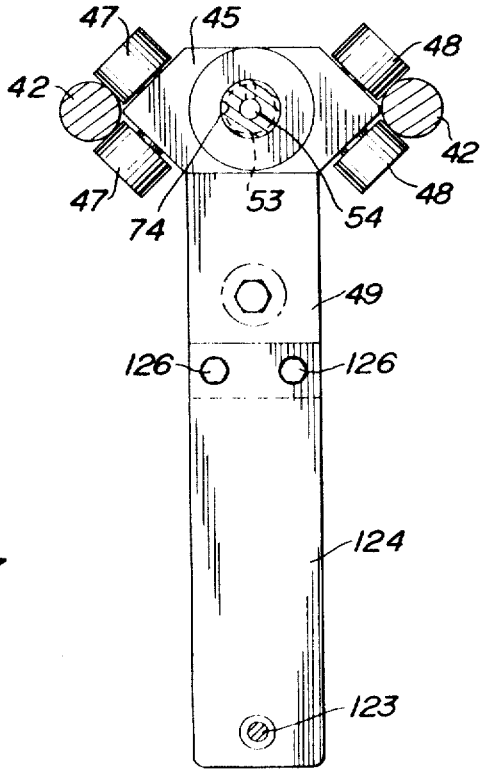
FIGURE 8 is an enlarged cross sectional view taken substantially along vantage line 8—8 of FIGURE 5, looking in the direction of the arrows thereon.

Means for guiding the spindle 36 for vertical reciprocating movement, comprise the laterally spaced guide rails 42, 42, formed as cylindrical rods in the particular illustrated embodiment, the upper guide plate 41 through which the spindle passes and a pair of superposed guide blocks 45 and 46 rotatably attached to the lower end of the spindle 36. The two blocks 45 and 46 are of similar construction and each carries four rollers 47, 47 and 48, 48 arranged in pairs, having their axes of rotation intersecting at right angles. This arrangement is best shown in FIGURE 8 of the drawings. As will be appreciated from the latter figure, the pairs of rollers at opposite ends of the blocks 45 and 46, engage the cylindrical outer surface of the spaced rails 42, 42, to roll therealong and thereby guide the blocks 45 and 46 along the rails, which in turn, guide the spindle 36 along a vertical axis. It is to be noted that by utilizing the two guide blocks 45 and 46, each carrying four rollers, and spacing said blocks 45 and 46 axially along spindle 36, a stabilized guide assembly is provided which defines a vertical axis of movement for the spindle 36, requiring the upper guide plate 41 to only loosely guide and steady the upper end of the spindle.

While the two guide blocks 45 and 46 are mounted to permit the spindle to rotate relative thereto, the same are axially locked to the spindle, one above and one beneath an intervening tongue member 49 which extends therefrom; two locking collar means 50 and 51 cooperating to axially fix the blocks and tongue in position on the spindle (see FIG. 5). The lower guide block 46 also is connected with a fitting and flexible conduit means 52 which communicate with the vacuum pump (not shown) and an annular chamber or groove 53 (see FIGURE 5) formed about the circumference of the spindle 36 internally of block 46. The groove 53 communicates with the internal bore 54 formed axially within the spindle 36 (see FIGURE 8). In this manner, then, the atmosphere of the bore 54, constituting the vacuum passageway, may be evacuated selectively by the vacuum pump to create a pneumatic suction within cup 35 at the upper end of the spindle 36, for gripping the lower or bottom end of a carton 55 on the mandril 22 as illustrated in FIGURE 5 of the drawings, when the spindle 36 is raised to its uppermost position as indicated in dotted lines in that figure. After the downward stroke of the spindle 36 is completed, the carton 55 is released from cup 35 and deposited on the upper runs of the double-belt conveyor means 24, as indicated in phantom at 55a in FIGURE 5.

Figure 7:
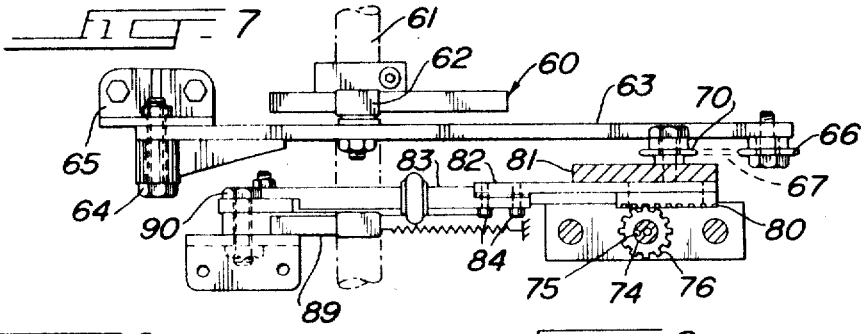
FIGURE 7 is a cross sectional view taken substantially along vantage line 7—7 of FIGURE 5 and looking in the direction of the arrows thereon.

In order to vertically reciprocate the spindle 36, as above mentioned, a drive cam 60, mounted on rotatably driven shaft means 61 is provided to engage a cam following roller 62 rotatably mounted intermediate the ends of a linear crank arm 63. The latter, as shown, is pivotally supported at one end on an axis defining pivot bolt means 64 fastened to the upper end of a support pedestal 65 mounted on the bed plate 44 of the machine. The outer or non-pivoted end of the crank arm 63 carries a rotatably mounted sprocket 66 over which is trained a suitable link chain 67. One end of the chain is anchored to the underside of the platform 39, as at 68 (see FIGURE 5), and the opposite end thereof anchored at 69 to one end of the tongue member 49 which projects past the two guide blocks 45 and 46 (see FIGURE 3). Intermediate the sprocket wheel 66 and the anchor point 69, the chain 67 is also trained over an intermediate idler sprocket 70 mounted below the platform 39 as best illustrated in FIGURES 5 and 7 of the drawings.

Figure 6:
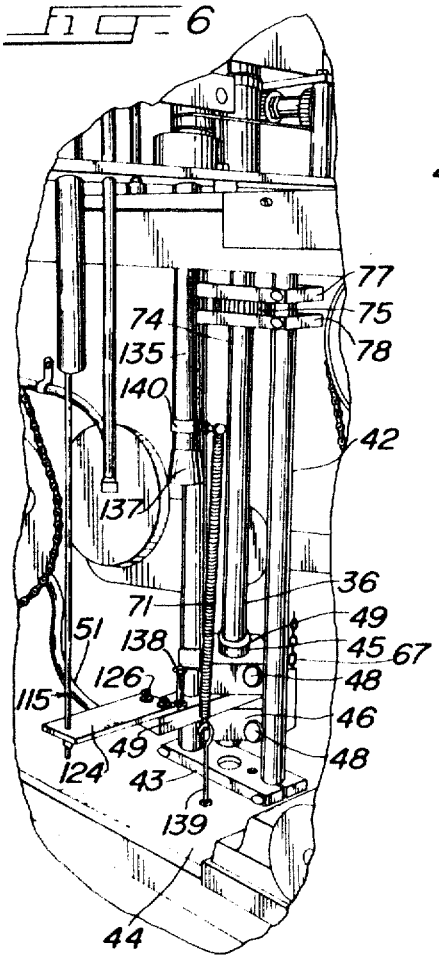
FIGURE 6 is another perspective view of the apparatus illustrated in FIGURES 1 and 2, showing the arrangement and orientation of parts and the means for sequentially actuating the same.

With this described arrangement it will be understood that the arm 63 is driven periodically to oscillate between its full line position and its dotted line position as set out in FIGURE 5 to accordingly cause the chain to raise the spindle so as to position the suction cup means 35 thereon in engagement with the bottom of a carton 55 on the mandril means 22; the spindle 36 returning downwardly by gravity and the assistance of return spring means 71 (see FIGURE 6).

It will be recalled that the means 23 not only serves to strip the cartons from the forming mandrils 22 and deposit the same on the belt conveyor means 24, but is also functional to selectively orient the cartons so as to dispose the top closure panels thereof, as defined by prescored fold lines of the carton blank, in proper relationship beneath the top former means 26 so that the latter may infold and form such panels regardless of the orientation of the top closure as it is discharged from the preforming machine, as previously discussed. To this end, in addition to the vertical reciprocating activity of the spindle 36 as hereinabove described, such member is also selectively rotatable to effect the desired carton orientation. It will be recognized from the heretofore appearing description of the connection of the guide block means 45 and 46 with spindle 36, that the latter is in fact mounted for rotation relative to said guide blocks. As illustrated best in FIGURES 3, 5, 6 and 7 of the drawings, the spindle 36 also is formed with a longitudinally extending groove 74 formed inwardly of the cylindrical exterior thereof which receives a cylindrical pin or key 75 (see FIGURE 7) for locking a drive gear 76 to the spindle so that the spindle and gear are conjointly rotatable while permitting the spindle to move longitudinally or axially relative to the gear.

As illustrated, gear 76 is mounted between a pair of parallel spaced plates 77 and 78 which are locked onto the two guide rails 42, 42 adjacently below the platform member 39. The two plates 77 and 78 extend transversely between the two guide rails and receive the spindle member 36 therethrough and hold the gear 76 and the locking pin 75 in operating position with the spindle 36. It will further be noted, particularly from FIGURE 3, that the gear 76 is engaged by a rack 80 supported on slide block 81 which in turn is suspended from the overdisposed plate 41 attached to the underside of the platform member 39. The rack 80 is carried at one end of a broken linear link means comprising link portions 82 and 83 interjoined by fasteners 84 (see FIGURE 7). The link portion 83 is formed as the cylindrical member supported intermediate its ends in a ring bearing 85 which depends from the underside of the platform 39 and is connected at its outer end to transverse pin means 86 mounted in an elongated slotted opening 87 of a shift means comprising a bell crank having arms 88 and 89, pivoted on pivot pin 90. The bell crank linkage as shown best in FIGURE 5 of the drawings, is connected by pin 90 to the lower end of a depending mounting pedestal 91, secured to the underside of the platform member 39. The arm portion 88 thereof further is equipped with suitable shifting lever 92 having a manually engageable knob means 93 at its outer end. Spring member 96 extends between the bell crank arm 88 and an anchor point [87] *97* on the framing of the machine so as to normally bias the bell crank clockwise as viewed in FIGURE 5. A cam following roller means 99 is mounted at the outer end of arm 89 and engages a rotatable actuating cam 100, mounted on the rotatably driven shaft 61 for conjoint operation with the cam member 60 previously described. It will be appreciated that with the roller means [90] *99* engaged with the periphery of the open face cam 100, the rack member 80 reciprocates a rotatably oscillate the gear 75, causing corresponding oscillating movement of the spindle 36. In effect the forward stroke of the rack causes a 90° rotation of the spindle 36 to similarly rotate or reorient a carton 55 engaged by the suction cup means 35 at the upper end of the spindle. The timing of the cam 100 is such that after release of the carton 55 by the spindle suction cup means and the deposit of the carton on the conveyor means 24, spindle 36 is rotatably returned to its original position with the return stroke of the rack 80.

It is to be noted especially, as best seen in FIGURE 5, that the operating arm 92 which is associated with the bell crank arm 88 may be manually engaged and moved from the full line position thereof to its dotted line position (see FIGURE 5) along a slotted opening 101 cut for that purpose in the platform member 39. In the dotted line position for the operating arm 92, a swingable lock means 102 is provided to keep or hold the operating arm 92 in its dotted line position at which the roller 99 on arm 89 of the bell crank is held out of engagement with the periphery of the cam means 100 to effectively prevent the above-described periodic oscillation of the spindle member 36.

Thus, it will be seen that the objective of this invention to provide means for selectively orienting cartons formed on the mandrils of a preforming machine is accomplished through the selective oscillating movement of the carton stripping means 23, as above-related. It also will be appreciated that since the two cam members 60 and 100, which respectively activate the spindle 36 axially and rotatably as hereinabove explained, are mounted on a common shaft for conjoint rotation, the timing movements of the spindle is fixed in a desired sequence and time relationship. Accordingly a carton 55 withdrawn from the mandril 22 by the suction cup means 35, is selectively indexed or oriented through 90° turn while the same is traveling between the mandril and the upper runs of the double-belt conveyor means 24 on which the same is deposited. This sequence of events is depicted in the schematic views 12 through 15 of the drawings which will be referred to in greater detail hereinafter.

Referring now to FIGURES 1, 2 and 3 of the drawings, it will be seen that the conveyor means 24, as illustrated, comprises a pair of endless belt members 104, 104 mounted in laterally spaced relationship so as to provide horizontal upper runs movable over the bed or bottom of the chute means 29. Each of the belts 104 is trained over separate guide wheels 105 at the entry end of the chute means, or that is the end closest to the preforming machine 20, and while the outer ends thereof are trained over reel portions 106 of a drive roller 107, power driven in response to actuation of a power driven chain drive means 108.

It is to be noted that discharge conveyor means 28 constitutes a single belt conveyor which moves substantially centrally over the bottom wall of the chute means 29 being trained over the driven roller 107 and an idler roller means 110 at the outer end of the chute means 29. By virtue of their common drive roller 107, the double-belt conveyor means 24 and the single belt discharge conveyor 28, more synchronously at like speeds, to promote an even movement of the formed cartons along the chute 29. After deposit of a carton onto the upper run of the conveyor means 24 by the spindle means 36, as hereinabove described, the carton advances along the chute means 29 until it engages the stop means 25, which extends upwardly past the plane of the bottom wall 31 for the chute means between two belts 104 of the conveyor means 24, as best illustrated in FIGURE 2 of the drawings. In this condition the container is positioned, ready for feeding to the overdisposed top former means 26.

Specific reference is now made to FIGURES 2–6 of the drawings, wherein stop means 25 for arresting the cartons is shown. As seen particularly in FIGURES 2 and 3, the stop means 25 comprises an inverted U-shaped metal bail having an upper platform portion 111 and depending spaced arm portions 112 which are laterally separated sufficiently to receive a metal block member 113 of substantially rectangular formation therebetween. The U-shaped stop member is mounted at the upper end of a cylindrical actuating rod 115, which is attached thereto by riveting over its upper end to form a head portion 116 centrally of the upper platform portion 111. Rod 115 extends downwardly through a cylindrical opening 117 in the mounting block 113 and axially through a tubular member 118 therebeneath (see FIGURE 4). Tubular housing member 118 is distinguished by a blind bore 119 forming a housing for a spring means 120 having its lower end bearing against the bottom of the bore 119. The upper end of the spring 120 is held beneath an adjusting nut member 121 engaged with a threaded portion 122 formed intermediate the ends of the rod member 115. It will be noted that the diameter of the rod member is reduced slightly axially below the threaded portion 122, thereby providing rod portion 123 of smaller diameter, which extends through and beyond an opening formed through the bottom end of the tubular member 118 for attachment to the outer end of a cantilever mounted actuating arm 124, as illustrated in FIGURE 3 of the drawings. Specifically, the lower end of the rod portion 123 passes loosely through an opening formed through the outer end of arm 124, and is detachably held thereto by a remaining nut 125 mounted on the threaded end portion of the rod, beneath the actuating arm 124, as illustrated.

The other or inner end of the actuating arm 124 is fixed to the tongue member 49 by bolt means or similar fasteners 126 (see FIGURES 3, 6 and 8 of the drawings).

It will be recalled that the tongue member 49 is held between and moves with guide block members 45 and 46 and the spindle 36, according to the vertical reciprocating activity of the later, as previously described. It is to be noted that at the bottom of the downstroke for the spindle 36 and the guide blocks 45 and 46, as imposed by the rotating cam means 60, the rod means 115 is positively pulled downwardly by the actuating arm 124 to compress the spring means 120 within the tubular member 118. This causes the stop member [110] *25* to be lowered or depressed beneath the plane of the bottom wall 31 for the chute means 29 and thereby permit a carton 55, being held against the stop member, to escape past the latter onto the discharge conveyor means 28, as depicted in FIGURE 18 of the drawings. This depression of the stop means 25 is only momentary and is timed to permit the escape of only one carton at a time therepast, following which spring 120 is released and immediately returns the stop means to raised position, as illustrated in FIGURES 2 and 3, and 4 of the drawings.

In order to feed the carton 55, which is against the stop means 25 to the overdisposed top former means 26 (see FIGURE 16), the feeder means 27 is elevated along with the stop means 25 in the manner depicted schematically in FIGURE 17 of the drawings. The means for accomplishing these operations are as follows:

As show in FIGURES 3 and 6 especially, the feeder means 27 comprises a rubber suction cup 130 mounted at the upper end of a tubular support member 131 having its interior communicating with a vacuum pump (not shown) by conduit means 132 attached to the lower end therof. Member 131 is rigidly held in the block member 113 on which the stop means also is carried and the suction cup has an orifice 133 at its bottom end which communicates with the periodically evacuated interior of the support member 131. The block member 113 in turn is clamped at one end by clamp bolt means 134 to the upper end of a rigid actuator rod 135 so that the latter, the block 113 and the tubular member of the feed means 27 are all tied together as a rigid system. The actuator rod 135 is slidingly mounted in a bearing collar 136 carried on the upper side of platform member [139] *39* and extends through the collar and below the platform, as shown in FIGURE 3. The lower end of the rod 135 is equipped with a shock pad 137, comprising a rubber bumper which is adapted to engage the upper end of an adjustable stop means 138 projecting upwardly from the tongue member 49, in coaxial alignment with the rod 135. The spring means 71 extends between a connector 139 on the base plate 43 of the machine and the lower end of the actuating rod 135; such being connected to the latter as by adjustable fastening means 140 (see FIGURE 6).

With the above-described arrangement, vertical upward movement of the spindle 36 and the attendant movement of the tongue member 49 therewith, serves to periodically engage the bumper [136] *137* with the adjustable stop means 138. This causes the actuator rod 135 to be thrust upwardly with continued elevation of the spindle 36. This upward movement of the rod 135 produces attendant upward movement of the block 113 and the feeder means 27 including the suction cup 130 and the tubular support 131. As the feeder means moves upwardly, it engages the lower end of a carton 55a positioned thereover on conveyor means 24 (see FIG. 3) and pneumatically grips the same in response to the evacuation of the interior of the tubular support. At the same time the stop member [110] *25* moves upwardly with block 113, along with the feeder means 27 to maintain the carton 55a in its aligned position with the overdisposed top crimper or former means 26. Eventually the upper end of the carton [55] *55a* is inserted into the top former means 26 and subsequently withdrawn therefrom in response to downward movement of the actuator rod 135 and the pulling activity of the spring means 71 attached thereto. As the carton 55a returns to the upper runs of the double-belt conveyor means 24, the stop member [110] *25* is momentarily retracted below the level of the chute bed 31, releasing the carton and permitting conveyor 24 to move the same onto the discharge conveyor means 28 as heretobefore described. The several operations above-noted are depicted schematically in FIGURES 16 through 18 of the drawings.

While the top former means 26 may comprise any of several known devices operative for the purpose of infolding the end panels of the gable top closure means, the particular former means 26 herein illustrated is preferred, as will be appreciated by those familiar with the art from the description thereof which follows.

Figure 9:
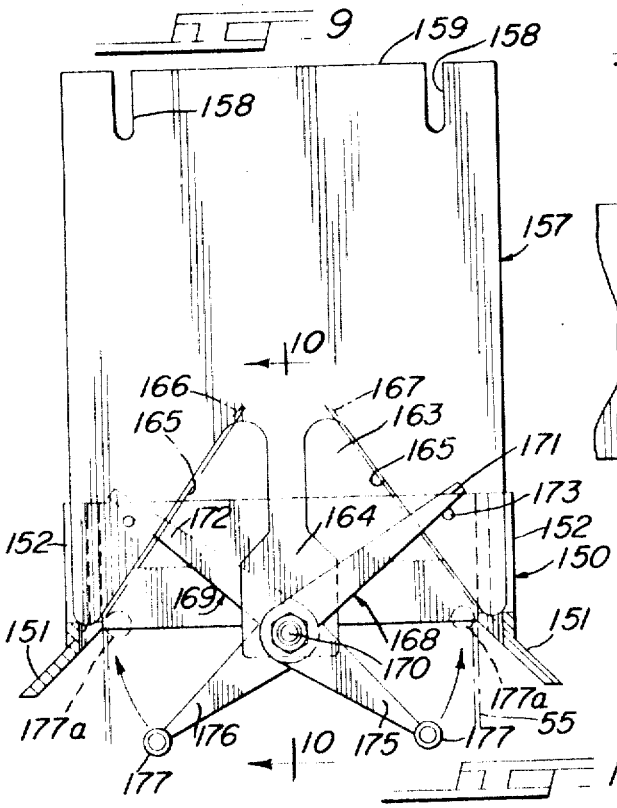
FIGURE 9 is a front elevational view of an improved top forming apparatus, according to this invention, with parts in section.
Figure 10:
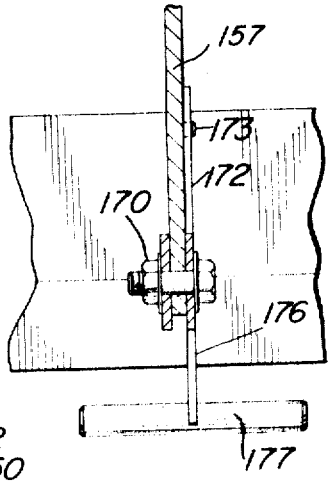
FIGURE 10 is a partial cross sectional view taken substantially along vantage line 10—10 of FIGURE 9 and looking in the direction of the arrows thereon.
Figure 11:
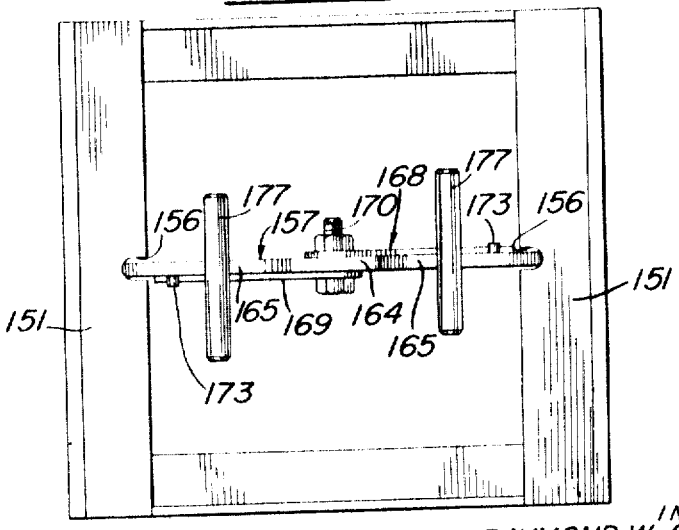
FIGURE 11 is a bottom plan view of the apparatus illustrated in FIGURE 9.

Referring to FIGURES 1, 3 and 9 through 11 of the drawings, the improved forming means 26 of this invention, as therein illustrated, comprises a substantially quadrangular metal cage means 150, having a square plan configuration interiorly conforming with the outside cross sectional dimensions of a carton 55 to be top formed therein. The cage 150 is distinguished by a pair of angularly inclined skirt walls 151, 151 extending outwardly of the lower end of two opposite side walls 152, 152 thereof, as best illustrated in FIGURE 9 of the drawings. The box like cage 150 is supported by depending brackets 153 attached to an overdisposed horizontal support arm 154 which is adjustably mounted on an upright column 155 extending vertically upwardly from the support platform 39 of the forming machine, adjacent the chute means 29 (see FIG. 1). It will be appreciated that the arm 154 is adjustable vertically along the length of the column 155 and the cage brackets 153 are adjustable along the arm 154 so as to accurately aline the cage means 150 registeringly over the underdisposed feeder means 27. Thus, upon upward movement of the feeder means the upper end of a carton 55 being held by the latter is inserted registeringly into the interior of the cage means 150 for infolding panels of the gable top closure [156] thereof, as illustrated in the schematic FIGURES 16 and 17 of the drawings.

Mounted slidingly within the cage means 150 and movable vertically along and between a pair of opposingly aligned vertical guide slots 156, 156 (see FIG. 11) formed in the opposite side walls 152, 152 of the cage means, is a gravity actuated forming plate 157 having means for effecting the necessary infolding operation of the gable panels of the carton's top closure. As will be noted from FIGURE 9 in particular, the plate 157 is formed with a pair of slotted openings 158 extending inwardly of the upper edge 159 thereof my which the same is attached to and between a pair of weight blocks 160, 160 which engage the upper edges of two spaced side plate members 161 of the support arm 154 (see FIGURE 1). The provision of the slotted openings 158 in the forming plate permits adjustable variation of the vertical position of the weight block to thereby regulate the lowered position of the forming plate 157 to accommodate slight variation in carton height.

The lower end of the forming plate 157 is distinguished by a substantially triangular shaped forming opening 163 (see FIG. 9) having a depending lobe portion 164 extending centrally thereof and in the plane of formation for the plate means 157. The side edges of the opening 163 indicated at 165, in FIG. 9 of the drawings, slope alike and define the infolded slope of the end gable panels 166 and 167 of the carton's top closure, as best shown in FIGURE 19 of the drawings.

Pivotally mounted at the lower end of the depending lobe portion 164, is a scissors linkage comprising a pair of bell crank members 168 and 169 which are pivotally mounted on a central pivot means 170 shown as a bolt attached to the lobe portion 164. It will be noted from FIGURE 11 in particular, that the bell crank members 168 and 169 are mounted on opposite sides of the forming plate. It also will be noticed that the outer end of the upper arm portions 171 and 172 of the two bell crank members 168 and 169, respectively, each engage a stop pin means 173 projecting outwardly of the adjacent face of the plate member 157 which serve to limit downward swinging movement of the arm portions 171 and 172. The two bell crank members 168 and 169 also include lower arm portions 175 and 176, respectively, each of which carries a folding bar 177 mounted transversely across to the outer end thereof (see FIGS. 9 through 11).

It will be observed that the upper arm portions 171 and 172 of the two bell crank members extend diagonally across the opening 163 to intersect the sloping edge portions 165, 165 thereof. Thus arm portions 171 and 172 are interferingly engaged by the upper ends of the gable panels 166 and 167 of a carton as it is thrust upwardly into the cage 150 by the raising activity of the feeder means 27. In so doing, the outer ends of the peak panels 166 and 167 serve to pivot the two bell crank members 168 and 169 in opposite direction, much as a pair of scissors might pivot, to swing the holding bars 177 at the outer ends of the lower arms 175 and 176 of the two bell cranks upwardly to their dotted line positions, as indicated at 177a in FIGURE 9 of the drawings. In such raised position each folding bar 177 resides inside of the carton and across the horizontal fold line 180 (see FIG. 14) defining the bottom fold line or edge of each of the two gable panels 166 and 167. Thus, when a carton is thrust upwardly to its fully raised limit inside of the cage means 150 the folding bars 177 enter the open upper end thereof and swing outwardly to interiorly support the gable panels across the horizontal fold lines 180 to effect a clean break and folding action. This produces a very positive inward folding of the gable panels along the fold lines 180 and is particularly successful in preventing inward collapse of the adjacent side walls 181, 181 of the carton (see FIG. 19).

As the carton with its top closure formed is withdrawn from the folding means 26 and moves downwardly in response to downward activity of the feeder means 27, the scissors linkage comprising the two pivotally mounted bell crank members 168 and 169 returns to the full line position therefor shown in FIGURE 9 of the drawings, ready for the next top folding and crimping operation.

It will be appreciated that by virtue of the slidable mounting arrangement for the plate means 157, and the addition of the gravity weight blocks 160 at the upper end thereof, the infolding of the end or gable panels of the top closure for the carton is brought about against a yieldable forming device wherein the plate means 157 is permitted to move upwardly by the time that the carton top is fully inserted into the forming cage means 150. This occurs at the uppermost limit of movement for the feeder means 27 as shown best in FIGURE 17 of the drawings.

From the foregoing description of the several means and elements combined in the present invention, it is believed that those familiar with the art will readily recognize the improvements and advantages afforded by the present invention over previously known means for the described purposes. In order to better understand the various functions and operations accomplished by this invention, however, reference will now be briefly made to FIGURES 12 through 18 of the drawings wherein the sequence of operations are schematically set forth.

As shown in FIGURE 12, a carton 55 is mounted on the mandril means 22 of the preforming machine ready to be stripped therefrom by the carton stripping and orienting means 23 according to this invention.

As depicted in FIGURES 13 through 15, the carton stripping means 23 sequentially is raised to its upper position whereat the suction cup means 35 thereon engages the lower sealed end of the carton and drags the same downwardly with the lowering movement of the spindle means 36. This strips or removes the carton 55 from the mandril means 22.

If desired, the manual operating lever 92 may be released from the lock means 102, so that the cam 100 is engaged by roller means 99, for selectively rotating or indexing the spindle 36 during the lowering movement thereof. According to the particular embodiment hereinabove described, a resultant 90° turning or reorienting of the carton 55 occurs with this operation, prior to the time the carton is deposited on the upper runs of the double-belt conveyor means 24. This functioning is shown sequentially in FIGURES 14 and 15 of the drawings.

After the carton 55 is deposited on the conveyor means 24 it is carried thereby against the stop means 25. Meanwhile the stripping means 23 and more particularly the spindle 36 thereof is reindexed or rotated to its initial starting position in the event the selective orientation means has been selectively activated. If the reorienting means is not selectively activated of course, the described rotation of the means 23 does not take place.

After the deposit of the carton on the conveyor means 24 by the stripping means 23, the carton advances to the periodically operated and now raised stop means 25 whereat the carton is arrested registeringly beneath the top former means 26. At such position the carton is next raised upwardly with the feeder means 27 while the stop means 25 remains in its carton engaging condition in the manner indicated schematically in FIGURES 16 and 17. As the carton enters the forming cage means the upper closure end of the carton is formed and folded by the top former means 26 whereafter the same is returned to the conveyor means 24 and the stop means 25 is momentairly lowered, permititng the carton to advance onto the discharge conveyor means 28. It is to be recognized that while the forming of the folds for the top closure means, as depicted in FIGURES 16 through 18, takes place separately from the stripping operation as shown in FIGURES 12 through 15, in fact, according to the particular embodiment of the present invention hereinabove described, raising of the spindle means 36 and the feeder means 27 both occur during the same rotational cycle of the cam means 60 and 100. It is to be noted, however, that the feeder means 27 elevates subsequent to the raising of the stripper means 23, correspondingly the lowering of the stripper means 23 and the top former feeder means 27 occur simultaneously, during the same rotational cycling of the cam means. In operation, a preforming machine equipped with the improved fabricating and orienting apparatus of this invention, functions in such a fashion that a carton 55 is being stripped from a mandril 22 and deposited on the conveyor means 24 substantially simultaneously with the removal of a carton from the top former means 26 and the deposit thereof on the conveyor means 24 for discharge to the filling and top sealing means, all in an automatic cycle.

Having thus described the preferred embodiment of the present invention, as illustrated in the accompanying drawings, it will be appreciated by those familiar with the art that the particulars of the specific embodiment hereinabove set forth may be modified, changed and equivalent elements and means substituted therein without departing from the spirit and scope of this invention. Consequently it is intended that the present invention be unlimited by the foregoing specification except as may appear in the following apended claims.

I claim:

1. In a machine for forming tubular paperboard cartons having bottom and top closures formed by folding panels thereof along predetermined fold lines, said cartons being carried on mandril means while the bottom closures thereof are formed and sealed: stripper means for removing cartons from said mandril means, top former means located remotely of said mandril means, means for transferring cartons from said stripper means to said top former means and cooperating with means positioning cartons for introduction to said former means, and means operable to index cartons selectively about their tubular axes to orient the panels of the top closures thereof in predetermined alignment for the folding thereof by said top former means.

2. The combination as set forth in claim 1 wherein said top former means include support means movable into the interior of a carton presented thereto for top forming, said support means engaging opposite interior walls of said carton adjacent fold lines of the top closure panels thereof whereby the latter may be folded about said fold lines without collapsing adjacent portions of the said walls.

3. The combination of claim 2 and means carrying said support means and actuating the same to and from engaging positions with said walls in response to the entry and withdrawal of cartons into and out of said former means, respectively.

4. The combination of claim 1 wherein said means operable to index cartons is periodically and selectively operable to index each of said cartons after it is removed from a said mandril means and before the deposit thereof on said means for transferring cartons.

5. The combination of claim 1 wherein said stripper means includes pneumatic suction cup means operable to grip and release cartons.

6. The combination of claim 1 wherein said stripper means comprises rectilinearly reciprocal means movable toward and away from said mandril means, drive means operable to periodically move said reciprocal means along the longitudinal axis thereof, gripper means mounted adjacent one end of said reciprocal means and periodically operable to grip the formed bottom of a carton on said mandril means to thereby couple the same to said reciprocal means for movement with the latter away from said mandril means, and said means to index cartons comprises means operable to selectively rotate said reciprocal means about its longitudinal axis whereby a carton coupled thereto is rotatably oriented to a predetermined position.

7. For use with paperboard carton preforming machines adapted to form and seal bottom closures of tubular paperboard cartons and position the same at a discharge station, the combination comprising top forming means located remotely of said discharge station for folding upper end portions of a carton discharged from the preforming machine into a top closure therefor, conveyor means for transferring cartons from said discharge station to said top forming means, stripper means for periodically removing cartons from said discharge station and depositing the same on said conveyor means, stop means periodically engaging and arresting cartons on said conveyor means to position the same for feeding to said top forming means, feeder means adjacent said stop means for removing cartons in said position from said conveyor means and feeding the same to said top [former] *forming* means and for returning the same to said conveyor means, and means for periodically releasing said stop means to permit cartons having their top closures formed to be moved therepast by said conveyor means.

8. The combination as set forth in claim 7 including selectively operable means for rotatably indexing cartons about their tubular axes after the same are removed from said discharge station and before the same are deposited on said conveyor means by said stripper means.

9. The combination set forth in claim 7 wherein said stripper means and feeder means each include pneumatically operated means for gripping and releasing cartons.

10. The combination set forth in claim 7 wherein said top forming means comprises means automatically operable upon the feeding of a carton thereto for interiorly engaging and supporting opposite walls of said carton while panel portions thereof are being folded into said top closure therefor.

11. The combination of claim 10 wherein the top closure of a said carton comprises a plurality of interconnected panel portions defined by prescored fold lines, and said top forming means comprises gravity actuated plate means having portions adapted to engage certain of said panel portions on opposite side walls of said carton and fold the same toward one another about fold lines at the lower ends thereof, and said means for supporting said carton interiorly comprises support bars movable in response to the folding of said panels toward one another to rigidly support said side walls parallel to and adjacent said fold lines to prevent inward collapse of said side walls.

12. The combination of claim 7 wherein said stripper means comprises a rectilinearly reciprocal spindle means having connection with drive means operable to periodically elevate and lower the same along a substantially vertical axis, means at the upper end of said spindle means for gripping the bottom end of a vertically disposed carton at said discharge station and release the same to said conveyor means, and selectively operable means for partially rotating said spindle means while the same is being lowered whereby a carton engaged and held by said gripper means thereof is selectively oriented about a vertical axis before being released to said conveyor means wherefore the orientation of cartons deposited on said conveyor means may be selectively changed from the orientation thereof at said discharge station.

13. The combination of claim 7 wherein said stop means moves with said feeder means and carton during movement of the latter to and from said top [former] *forming* means.

14. For use with paper carton preforming machines adapted to form and seal bottom closures of tubular paperboard cartons: improved top forming means for forming top closures on the cartons comprising open cage means axially receptive of top end portions of a carton and having an interior configuration conforming to the exterior configuration and cross-sectional dimensions of said top end portions, slide plate means slidingly mounted across the interior of said cage means to interferingly engage certain panels formed on the top end portion of a said carton as it enters said cage means to thereby fold said panels toward one another, gravity weight means attached to said slide plate means for opposing sliding movement thereof away from said panels as the latter are moved thereagainst, and means supported on said plate means adapted to enter the top end of a carton as the same enters said cage means and comprising means for interiorly supporting walls of said carton adjacent predetermined fold lines at the base ends of said certain panels.

*15. In a container fabricating apparatus adapted to form and seal bottom closures of tubular cartons by folding portions of said cartons along fold lines, the apparatus having a discharge station for said cartons: means for transferring said cartons away from said discharge station, and reciprocable means engageable with the bottom portions of said cartons for rotating said cartons around their tubular axes and thereby orienting said cartons in predetermined relation to said means for transferring.*

*16. In a container fabricating apparatus for tubular cartons having bottom and top closures formed by folding portions of said cartons along fold lines, and having mandril means on which said cartons are carried while the bottom closures are formed: means for transferring said cartons away from said mandril means, stripper means for removing cartons from said mandril means and discharging them to said transferring means, and means operable to rotate said stripper means to thereby index said cartons about their tubular axes to orient the top portions of said cartons in predetermined alignment relative to said transferring means.*

*17. For use with a container pre-forming machine adapted to form and seal bottom closures of tubular cartons having bottom and top closures formed by folding portions of said cartons along fold lines, the machine having a discharge station for said cartons: means for transferring said cartons away from said discharge station, said means comprising a conveyor, and means engageable with the bottom faces of said bottom closures and operable to index said cartons about their tubular axes to orient the top portions of said cartons in predetermined relation to said conveyor.*

*18. The combination set forth in claim 17, and in which said last mentioned means includes a pneumatic suction device engageable with said bottom faces of said cartons.*

*19. The combination set forth in claim 17, and in which said last mentioned means includes an elongated member having one end engageable with said bottom faces of said cartons, and means for rotating said elongated member around its longitudinal axis.*

*20. The combination set forth in claim 19, and in which said elongated member comprises a stripper and is movable longitudinally to remove said cartons from said discharge station.* patent.

References Cited

The following references, cited by the Examiner, are of record in the patented file of this patent or the original patent.

UNITED STATES PATENTS

| | | | |
|---|---|---|---|
| 3,045,802 | 7/1962 | Miller | 198—33 |
| 3,248,841 | 5/1966 | Heffelfinger et al. | 53—375 XR |

BERNARD STICKNEY, Primary Examiner

Disclaimer

Re. 26,656.—*Raymond W. Guzzardo*, McHenry, Ill. CONTAINER FABRICATING AND ORIENTING APPARATUS. Patent dated Sept. 2, 1969. Disclaimer filed Sept. 17, 1970, by the assignee, *E. M. Melahn, doing business as Northern Illinois Machine Company.*

Hereby enters this disclaimer to claims 1 to 20, inclusive, of said patent. [*Official Gazette May 25, 1971.*]